United States Patent [19]
Johnson

[11] Patent Number: 4,767,209
[45] Date of Patent: Aug. 30, 1988

[54] LIMITED DIFFRACTION FEEDBACK LASER SYSTEM HAVING A COMPOSITE SENSOR

[75] Inventor: William M. Johnson, Sudbury, Mass.

[73] Assignee: The Charles Stark Draper Laboratory, Inc., Cambridge, Mass.

[21] Appl. No.: 792,057

[22] Filed: Oct. 28, 1985

[51] Int. Cl.⁴ .................. G01B 11/26; H01S 3/00
[52] U.S. Cl. .................. 356/152; 250/332; 250/342; 244/3.16; 358/109; 358/113; 330/4.3
[58] Field of Search .................. 89/41.05, 41.06; 244/3.13, 3.16; 250/332, 342, 339; 358/109, 113; 330/4.3; 356/152

[56] References Cited

U.S. PATENT DOCUMENTS

| | | | |
|---|---|---|---|
| 4,020,739 | 5/1977 | Piotrowski et al. | 89/41.06 |
| 4,040,744 | 8/1977 | Schertz et al. | 250/332 |
| 4,146,329 | 3/1979 | King et al. | 356/152 |
| 4,155,096 | 5/1979 | Thomas et al. | 244/3.13 |
| 4,324,491 | 4/1982 | Hueber | 356/152 |
| 4,422,758 | 12/1983 | Godfrey et al. | 356/152 |
| 4,429,993 | 2/1984 | Schick | 356/152 |

*Primary Examiner*—Stephen C. Buczinski
*Attorney, Agent, or Firm*—Weingarten, Schurgin, Gagnebin & Hayes

[57] ABSTRACT

A low diffraction-feedback high-energy laser system includes an injection laser, a master oscillator power amplifier (MOPA), and means for aligning the injection laser to the MOPA. A composite sensor for providing a dual-sensing capability is disclosed including a mosaic array and a superposed quad sensor.

9 Claims, 4 Drawing Sheets

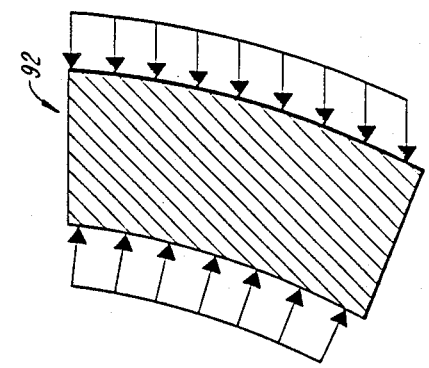
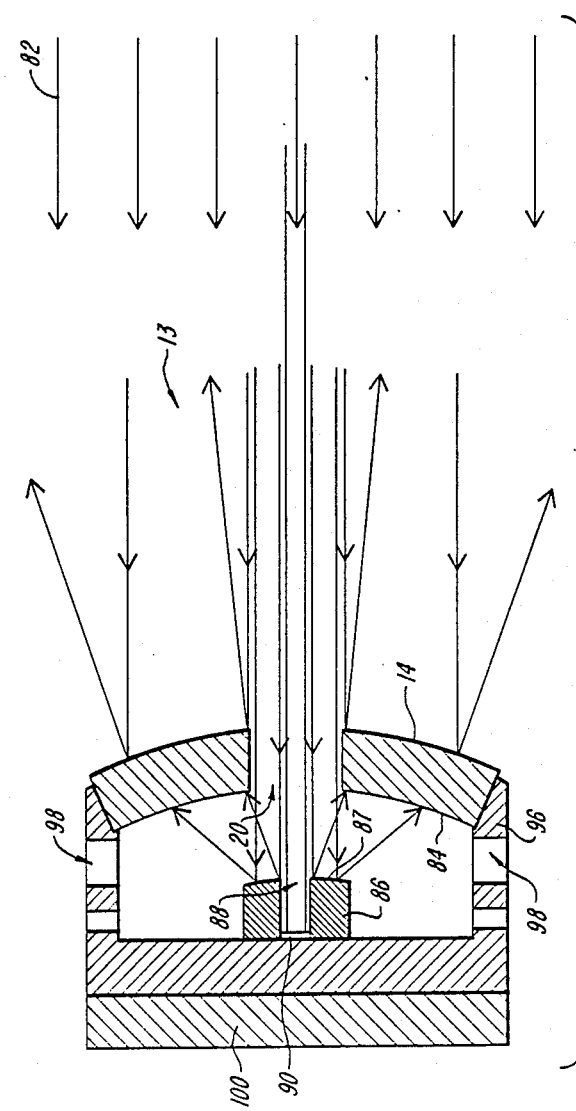

LIMITED DIFFRACTION FEEDBACK LASER SYSTEM HAVING A COMPOSITE SENSOR

CROSS-REFERENCE TO RELATED APPLICATIONS

This invention is related to three co-pending applications filed on even date herewith, respectively entitled LIMITED DIFFRACTION FEEDBACK LASER SYSTEM, LIMITED DIFFRACTION FEEDBACK LASER SYSTEM HAVING A CONTROLLED DISTORTION CAVITY-FEEDBACK MIRROR, and LIMITED DIFFRACTION FEEDBACK LASER SYSTEM HAVING A CAVITY TURBULENCE MONITOR, each of the same assignee as herein and respectively invented by William M. Johnson, William M. Johnson, and William M. Johnson et al, each incorporated by reference.

FIELD OF THE INVENTION

This invention is directed to the field of optics, and more particularly, to a novel limited diffraction feedback laser system having a composite sensor, controlled distortion cavity-feedback mirror and cavity turbulence monitor.

BACKGROUND OF THE INVENTION

In many applications including directed energy weapons systems, it is desirable to both transmit outgoing pulses of high energy laser light and to receive reflected return energy from a target during the interpulse intervals along the same but reciprocal optical path. Such systems are called upon to separate the outgoing and received optical energies along a common optical aperture, to detect the relative mis-alignment therebetween, and to correct the relative misalignment between the outgoing and received optical energies to maintain subsequent pulses both on-target and in-focus.

One impediment to the utility of such systems is thermal loading. As the outgoing laser energy is produced, it is partly absorbed as heat by the cavity mirrors of the optically active cavity. The mirrors thermally expand, changing their figure, which therewith throws the outgoing laser pulses out of focus. In addition, both the phenomena of edge diffraction off of the cavity mirrors and that of intracavity turbulence tend to break up the high energy laser beam formation process. Such systems are thus further called upon to provide an outgoing beam of high energy laser light in a manner that is substantially free of the undesirable effects of cavity mirror thermal loading, intracavity turbulence, and cavity diffraction-feedback.

SUMMARY OF THE INVENTION

The high-energy laser system of the present invention includes a primary concave reflector and a spaced secondary convex reflector having a common focus and defining therebetween an optical oscillation and amplification cavity. The primary and secondary reflectors each include a central aperture therethrough, and the secondary reflector is sized to be slightly larger than, or the same size as, the hole in the primary reflector. An injection laser is coupled to the optical oscillation and amplification cavity through the hole in the primary reflector. An array of injection laser sensors and cooperative relay mirrors are provided intermediate the injection laser and the optical oscillation and amplification cavity for aligning the injection laser vis-a-vis the axis of the optical oscillation and amplification cavity. The injection laser and oscillation and amplification cavity cooperate with the relative sizes of the apertured convex reflector and of the apertured concave reflector to minimize diffraction-feedback and therewith to prevent the breaking up of the high power beam.

A specular member sized to be at least as large as the hole of the convex secondary reflector is provided behind the secondary reflector. The specular member includes a central hole therethrough, and a sensor is positioned therebehind. The injection laser is incident on the sensor behind the hole in the specular member of the convex secondary reflector, and the sensor provides a signal in real-time representative of intracavity turbulence. The injection laser energy is deviated off of the specular member and onto the back of the convex secondary reflector. Both surfaces thereof are thereby uniformly thermally loaded, and in such a way as to preserve the figure of the secondary cavity mirror and therewith the focal condition of the outgoing high-energy beam.

Means including an alignment laser and a common optical aperture laser separator are cooperative with a composite sensor to provide outgoing and return energy alignment in real-time and to provide injection laser alignment with the optical axis of the cavity. The composite sensor preferably includes a mosaic array sensor and a superposed quad cell sensor. In one embodiment, the laser separator is provided internally of the cavity. In a further embodiment, it is positioned externally of the cavity. In both embodiments, the composite sensor provides both a cavity boresighting and an injection laser alignment function.

BRIEF DESCRIPTION OF THE DRAWINGS

These and other features and attendant advantages of the present invention will become apparent as the invention becomes better understood by referring to the following solely exemplary and non-limiting detailed description of the preferred embodiments thereof, and to the drawings, wherein:

FIG. 3 illustrates in FIG. 3A a pictorial diagram, and illustrates in FIG. 3B a fragmentary and enlarged pictorial diagram, of a controlled distortion cavity-feedback mirror of the limited diffraction feedback laser system having a composite sensor, controlled distortion cavity-feedback mirror and cavity turbulence monitor according to the present invention.

DETAILED DESCRIPTION OF THE PREFERRED EMBODIMENTS

Figure 1:
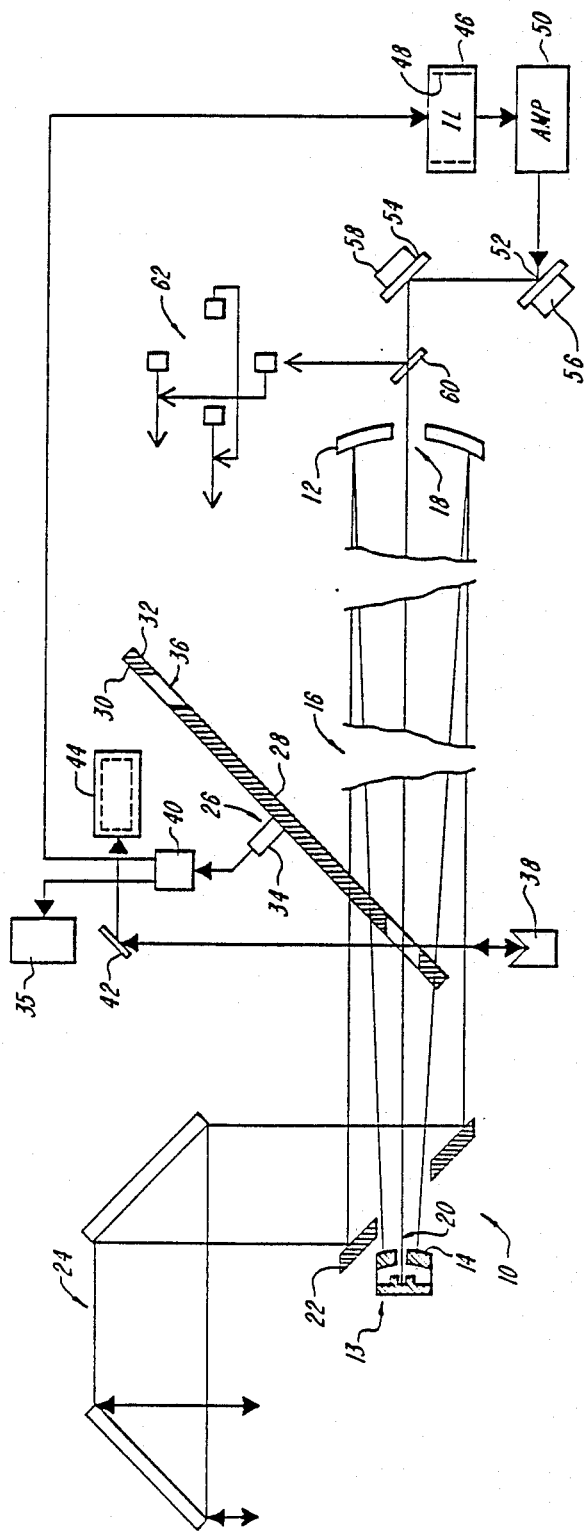
FIG. 1 is a schematic diagram illustrating one embodiment of the limited diffraction feedback laser system having a composite sensor, controlled distortion cavity-feedback mirror and cavity turbulence monitor according to the present invention.

Referring now to FIG. 1, generally designated at 10 is a schematic diagram illustrating one embodiment of the novel limited diffraction feedback laser system having a composite sensor, controlled distortion cavity-feedback mirror and cavity turbulence monitor according to the present invention. The system 10 includes a primary concave reflector 12 and a spaced-apart controlled distortion secondary reflector assembly generally designated 13 to be described. The assembly 13 includes a convex secondary reflector 14 that defines with the primary reflector 12 an optical oscillation and amplification cavity therebetween that is generally designated at 16. The primary reflector 12 and the secondary reflector 14 each have a radius of curvature and a focal point, and are so spaced-apart that their focal points are coincident. The radii of curvature of the reflectors 12, 14, and their diameters, are selected in well-known manner to provide an intended cavity magnification factor. The reflector 12, 14 are preferably spherical segments, although other conical segments can also be employed, and are preferably fabricated entirely of any suitable metal capable of accepting and retaining such a high degree of polish as to provide a specular surface.

The primary concave reflector 12 has a central aperture therethrough generally designated 18. The secondary reflector 14 is preferably dimensioned to be slightly larger than, or of the same size as, the central aperture 18 of the primary reflector 12, and it includes a central aperture generally designated 20 therethrough that is in the shadow of the aperture 18 of the primary reflector 12. The aperture size and alignment prevent optical cavity energy from feeding back into the injection laser cavity. A 45° scrapper mirror 22 preferably is provided around the secondary reflector 14. Light pulses that walk-out of the cavity 16 in well-known manner are deviated off the scrapper mirror 22 through optics generally designated 24 and onto a targeted object, not shown. Return energy present along the same but reciprocal optical path during the interpulse intervals of the outgoing light pulses are deviated through the optics 24 and the mirror 22 into the cavity 16.

A laser separator generally designated 26 is provided intermediate the primary and secondary reflectors 12, 14 for separating outgoing and return optical energy along a common optical aperture. The laser separator 26 preferably includes a metallic disk 28 having polished specular surfaces 30, 32 that is mounted for rotation with the shaft of a motor 34. The disk 28 includes at least two apertures generally designated 36 therethrough. As the disk 28 rotates, the apertures 36 thereof are aligned with the axis of the cavity 16 for some angular orientations of the disk 28, and at other angular orientations thereof, the reflecting surfaces 30, 32 are aligned with the axis of the cavity 16.

Reference may be had to co-pending U.S. utility patent application Ser. No. 512,153, now U.S. Pat. No. 4,684,796, entitled COMMON OPTICAL APERTURE LASER SEPARATOR FOR A RECIPROCAL PATH OPTICAL SYSTEM, invented by William M. Johnson and assigned to the same assignee as the instant invention, incorporated herein by reference, for a further description of the laser separator.

An alignment laser 35 and a confronting extended corner cube reflector 38 are provided transverse the axis of the cavity 16 and to either side of the disk 28. The alignment laser may be any suitable cw or pulsed laser device. A beam splitter 42 is positioned along the path of the alignment laser 35 to deviate light present therealong onto a composite sensor generally designated 44 to be described.

An injection laser 46 designated "IL" having spaced cavity mirrors schematically illustrated in dashed lines 48 is coupled to the cavity 16 via a laser amplifier 50 designated "AMP" and relay mirrors 52, 54 positioned in spaced relation along the optical path of the injection laser. The injection laser 46 is coupled to the synchronizer 40, and it preferably is pulsed, although a cw laser can be employed. Two degree of freedom x, y tilt actuators 56, 58 respectively are mounted to the backs of the relay mirrors 52, 54 for controlling their azimuthal and elevational pointing direction. A beam splitter 60 is provided intermediate the relay mirror 54 and the primary reflector 12 and along the axis of the cavity 16. A plurality of injection laser centering sensors schematically illustrated generally at 62 to be described are provided to maintain the injection laser beam aligned with the aperture 18 of the primary reflector 12 so that it enters the cavity 16 along the cavity axis.

Figure 2:
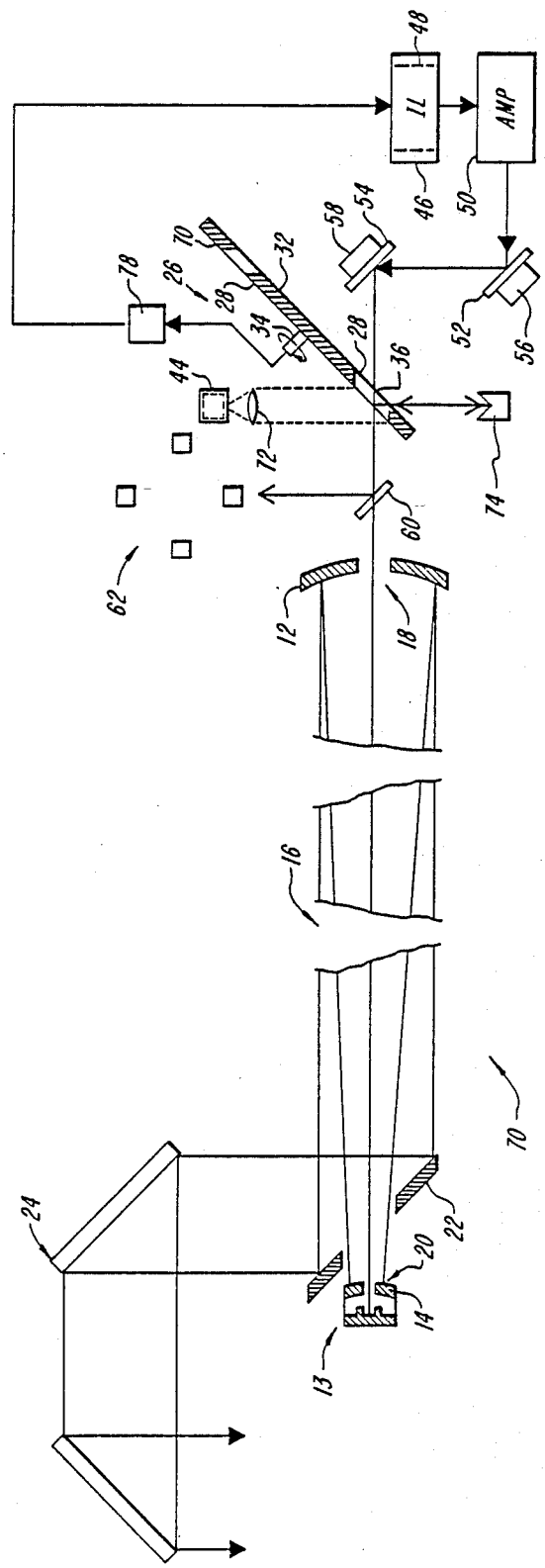
FIG. 2 is a schematic diagram illustrating another embodiment of the limited diffraction feedback laser system having a composite sensor, controlled distortion cavity-feedback mirror and cavity turbulence monitor according to the present invention.

Referring now to FIG. 2, generally designated at 70 is another embodiment of the limited diffraction feedback laser system having composite sensor, controlled distortion cavity-feedback mirror and cavity turbulence monitor according to the present invention. The system 70 as in the embodiment of FIG. 1 includes the primary reflector 12 having the central aperture 18, and the secondary reflector 14 having the central aperture 20 defining therebetween the optical oscillation and amplification cavity 16. The 45° scrapper mirror 22 is preferably disposed around the secondary reflector 16. The beam control optics 24, the relay mirrors 52, 54 with associated tilt actuators 56, 58, the beam splitter 60, the centering sensors 62, the injection laser 46 having the cavity mirrors 48, and the laser amplifier 50 are common to the FIGS. 1 and 2 embodiments.

The embodiment of FIG. 2 differs from the embodiment of FIG. 1 principally in the location of the common optical aperture laser separator 26, and in the manner and mode of operation of the overall laser system. In the embodiemtn of FIG. 2, the laser separator 26 is positioned exteriorly of the optical oscillation and amplification cavity 16 and behind the primary concave cavity reflector 12. The magnification of the cavity 16 is such that the placement of the laser separator exteriorly of the cavity 16 allows the selection of a smaller and faster spinning disk 28 and the provision of a correspondingly higher bandwidth response. Imaging optics 72 are positioned on the optical path defined between the reflecting surface 30 of the spinning metallic disk 28 and the composite sensor 44. An extended corner cube reflector 74 is provided on the optical path defined between the reflecting surface 32 of the spinning disk 28 and the composite sensor 44. A synchronizer 78 responsive to the angular orientation of the spinning disk 28 is coupled to the injection laser 46.

Referring now to FIG. 3A, generally designated at 13 is an enlarged schematic view illustrating the controlled-distortion cavity-feedback mirror assembly of the limited diffraction feedback laser system according to the present invention. The secondary cavity reflector assembly 13 includes the convex mirror 14 having the central aperture 20 therethrough. The convex reflector 14 is preferably fabricated of metal, and the surface thereof confronting the injection laser, schematically illustrated by parallel rays 82, is highly polished to provide a specular surface. The back surface 84 thereof preferably is coated with a black or other heat absorbing film.

A member 86 sized to be at least as large as the size of the aperture 20 of the convex reflector 14 is positioned in spaced relation to the absorbing surface 84 of the convex reflector 14. The member 86 has a specular surface 87, and has a central aperture generally designated 88 therethrough aligned with and in the shadow of the aperture 20 of the mirror 14 (FIGS. 1, 2). A quad sensor 90 is positioned within the opening 88 to receive injection laser energy that passes through the apertures 20, 88 (FIGS. 1, 2). The specular member 86 is preferably fabricated of solid metal. The reflectivity of the specular members 86, 14, the absorbtivity of the surface 84, and the dimensions of the apertures 20, 88 are selected to provide an intended heat distribution on the front and back surfaces of the member 14 in response to incident cavity energy. Preferably, the amount of heat absorbed by the front specular surface is selected to be equal to the amount of heat absorbed by the back surface 84 so that the convex secondary cavity mirror 14 substantially uniformly changes in dimension in response to thermal loading, and thereby maintains its figure undistorted as illustrated generally at 92 in FIG. 3B.

The specular members 14, 86 and the quad cell 90 preferably are mounted to a housing 96. The housing preferably includes apertures generally designated 98 therethrough. The apertures 98 allow a heat transport fluid, not shown, to flow through the housing 96 and into contact with the back of the member 14 to further control the heat absorbtivity characteristic of, and therewith the thermal loading effects on, the assembly 13. Other thermal absorbtivity control means such as an axially variable plunger mounted to the specular member are also possible within the scope of the invention.

The controlled distortion cavity mirror assembly is capable of establishing and maintaining an intended mirror figure useful, among other things, to adapt the focal characteristic of the outgoing high-energy laser light to changing system parameters. The mirror assembly can be spun about its axis to further control thermal effects, and reference in this connection may be had to co-pending United States utility patent application Ser. No. 512,172, now U.S. Pat. No. 4,580,270, entitled HIGH-ENERGY LASER HAVING GYROSCOPICALLY STABILIZED OPTICAL ELEMENTS, invented by William M. Johnson et al and assigned to the same assignee as the instant invention, incorporated herein by reference. Reference may also be had to allowed U.S. utility patent application entitled MOVEMENT AND FOCUS CONTROL SYSTEM FOR A HIGH ENERGY LASER filed on even date herewith, invented by Milton B. Trageser and assigned to the same assignee as the instant invention, incorporated herein by reference, for its disclosure, among other things, of a closed-loop focus control system.

A x, y tilt actuator 100 is mounted to the housing 96 for controlling the orientation of the cavity mirror 14 in elevation and in azimuth to establish and maintain an intended pointing direction. The quad sensor 90 is responsive to the position of the centroid of the injection laser energy 82 relative to optical null to provide a signal representative of the turbulence in the cavity 16 FIGS. 1, 2) in real-time.

Figure 4A:
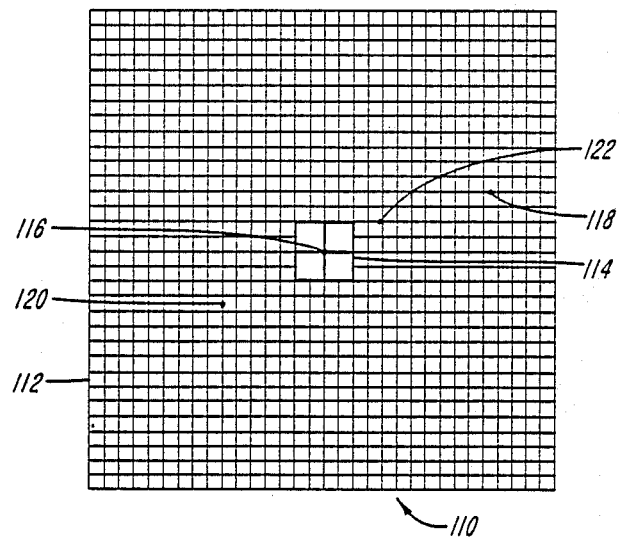
FIG. 4 illustrates in FIGS. 4A and 4B plan diagrams illustrating a composite sensor of the limited diffraction feedback laser system having a composite sensor, controlled distortion cavity-feedback mirror and cavity turbulence monitor according to the present invention and illustrates in FIGS. 4C and 4D partial schematic diagrams illustrating the composite sensor as hardwired in FIG. 4C and as utilizing preselected pixels of the mosaic array to provide the quadcell function in FIG. 4D according to the present invention.
Figure 4B:
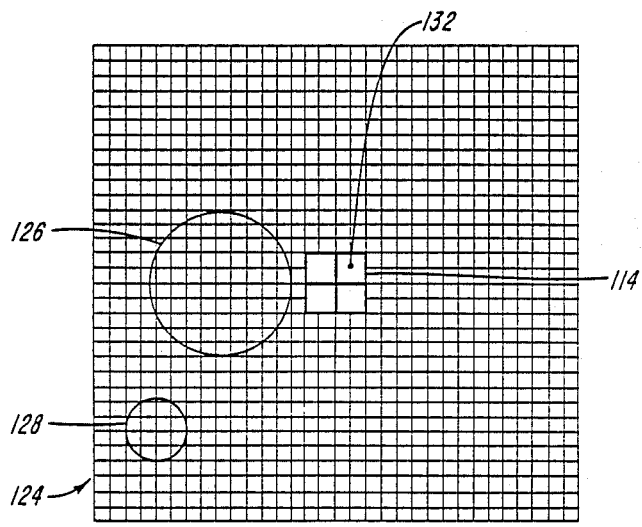

Referring now to FIG. 4, generally designated at 110, 112 respectively in FIGS. 4A, 4B are plan pictorial views illustrating the composite sensor of the high-energy injection laser system according to the present invention. The composite sensor provides a dual-function capability from a single sensor location. System integratability is thereby improved, and overall system design is simplified and enhanced due to an elimination of the need for any optics and/or coordinating circuitry that would otherwise be required by separate and independent sensors. The composite sensor preferably includes a comparatively-large $N \times N$ mosaic array 112 for providing a multiple-spot wide field-of-view tracking capability to be described. A comparatively-small quad cell sensor 114 preferably is superposed on the mosaic array 112 for providing a wide-bandwidth and narrow field-of-view nulling capability to be described. The quad cell sensor 114 is preferably mounted to the center of the mosaic array 112, as is illustrated in FIG. 4, or it can be mounted at any other suitable location thereof. It should be noted that although a separate quad cell sensor is preferred, as shown in FIG. 4C preselected dedicated pixels of the mosaic array 112 can also be employed as shown in FIG. 4D. A multiple wavelength capability constitutes an additional advantageous feature of the composite sensor of the present invention. The mosaic array and the quad cell array can each be operated at a selected different wavelength, for example, at the visible and infrared portions of the spectrum.

In operation and referring now to FIGS. 1, 3A, and 4A, at times synchronous with the axial alignment of the openings 36 of the laser separator 26 with the axis of the cavity 16, the injection laser 46 is repetitively operative to produce an injection laser beam. Each such pulse is amplified in the amplifier 50 and deviated off of the relay mirrors 52, 54 through the aperture 18 of the primary concave reflector 12 and into the cavity 16. The injection laser beam oscillates between the cavity mirrors of, and is amplified by, the cavity 16. The number of round-trip oscillations depend on the selected magnification factor of the cavity. While in the presently preferred embodiment, the parameters of the cavity are selected such that the light undergoes three (3) oscillations therein, it will be appreciated that five (5), seven (7) and nine (9) etc oscillations are possible. The amplified light walks-off the convex secondary reflector 14 and onto the scrapper mirror 22. The mirror 22 deviates the outgoing high energy laser pulses through the optics 24 onto a targeted object.

The injection laser oscillates a selected small number of times in the oscillation and amplification cavity, namely the three times of the presently preferred embodiment. With each oscillation, diffraction off of the periphery of the secondary convex mirror 14 feeds back into the grain region of the cavity, but because of the small number of oscillations, the diffraction effects are insufficient to break-up the formation of the outgoing high-energy beam. In addition, the physics of the cavity is such that the secondary cavity mirror generates an aperture stop effect in relation to the primary cavity mirror so that by selecting as above disclosed the size of the secondary cavity-feedback mirror to be slightly larger than, or the same size as, the hole in the primary reflector diffraction effects are thereby further minimized.

Cavity turbulence operates to deflect the injection laser beam off the axis of the cavity. The quad sensor 90 (FIG. 3A) of the convex feedback mirror assembly 13 (FIG. 3A) is operative in response to the position of the centroid of the injection laser energy relative to optical null to provide a signal representative of the degree of cavity turbulence. A tilt control signal, not shown, responsive to the quad sensor signal is applied to the x, y actuator 100 (FIG. 3A) to compensate the pointing direction of the cavity mirror for high-frequency cavity turbulence effects just prior to the outgoing high-energy laser pulses. In this manner, pulse-to-pulse tilt effects induced by cavity turbulence are monitored and corrected in real-time.

The thermal load provided by the controlled distortion assembly 13 preferably is balanced on the front and back surfaces of the cavity mirror 14. It therewith maintains its figure, and the outgoing pulses of outgoing high-energy laser light thereby remain in-focus and on-target. As will be appreciated by those skilled in the art, it is also possible to so load the mirror assembly as to provide an intended figure useful, for example, in system focus control.

During the interpulse intervals of successive outgoing pulses of high-energy laser light and synchronous with the alignment of the reflecting surfaces 30, 32 with the axis of the cavity 16, the injection laser light is deviated off the reflecting surface 32 of the laser separator 26 and onto the extended corner cube reflector 38. The reflector 38 deviates the injection laser energy onto the beam splitter 42 from which a portion thereof is deviated onto the quad sensor 114 of the composite sensor 112 (FIG. 4A). In response to any spacial dis-locations off optical null in the position of the injection laser energy centroid, the composite sensor 112 provides a signal representative of the internal misalignment of the injection laser with the optical axis of the cavity. An injection laser tilt control signal, not shown, responsive to the misalignment signal is applied to the x, y actuator 58 on the relay mirror 54 to maintain the injection laser aligned with the cavity axis and centered on the secondary reflector 14.

The beam splitter 60 deviates a portion of the injection laser energy onto the centering sensor array 62. The array 62 is shown in the plane of the Figure for ease of representation, but it will be appreciated that it is located in a plane perpendicular to the plane of the Figure. The two sensors thereof disposed about the horizontal direction of the Figure are operative to provide a signal representative of the relative azimuthal position of the injection laser beam, and the sensors thereof disposed about the vertical direction of the Figure are operative to provide a signal representative of the relative elevational position of the injection laser 48. A control signal, now shown, responsive to the centering array sensor signals is applied to the x, y actuator 56 of the relay mirror 52 to maintain the injection laser externally aligned with the cavity axis and centered at the aperture 18 of the concave mirror 12. In this manner, the relay mirrors 52, 54 establish and maintain the coaxial alignment of the injection laser with the optical oscillation and amplification cavity 16.

During the interpulse intervals of successive outgoing pulses and synchronous with the alignment of the reflecting surface 30 of the separator 26 about the common optical aperture, return energy present along the same but reciprocal path of the outgoing pulses is deviated by the scrapper mirror 22 onto the reflecting surface 30 of the spinning disk 28. The return energy is deviated therefrom onto the beam splitter 42, which deviates it onto the mosaic array 112 of the composite sensor 110 producing a spot 118 (FIG. 4A) thereon representative of the return optical energy.

At times synchronous with the alignment of the reflecting surfaces 30, 32 of the separator 26 with the optical axis of the cavity 16 and during the interpulse intervals of successive outgoing high-energy laser light, the beam of the alignment laser 35 is deviated off the reflecting surface 30 onto the cavity mirror 14, and back therefrom off the reflecting surface 30 to the beam splitter 42. The splitter 42 deviates it onto the mosaic array 112 of the composite sensor 110 producing a spot 120 thereon (FIG. 4A) representative of the pointing direction of the cavity mirror 14.

Another portion of the alignment laser during the interpulse intervals is deviated off the extended corner cube reflector 38 onto the reflecting surface 32 of the laser separator 26, and from there onto the concave primary reflector 12. It is reflected back therefrom again off the reflecting surface 32 back through the extended corner cube reflector 38 and onto the beam splitter 42. The splitter 42 deviates the beam onto the mosaic array 112 of the composite sensor 110 producing an image 122 (FIG. 4A) thereon representative of the pointing direction of the concave mirror.

The centroids and sizes of the spots 118, 120, 122 on the sensor 112 represent the relative mis-alignment of the outgoing and return optical energy. Any suitable means responsive to the position and sizes of the centroids of the spots 118, 120 and 122 may be employed to maintain subsequent outgoing pulses on-target and in-focus. Reference may be had in this connection to allowed co-pending U.S. utility patent application Ser. No. 516,468 entitled COMMON OPTICAL APERTURE LASER BORESIGHTER FOR RECIPROCAL PATH OPTICAL SYSTEMS invented by William M. Johnson et al and assigned to the same assignee of the instant invention, and the U.S. utility patent application filed on even date herewith entitled MOVEMENT AND FOCUS CONTROL SYSTEM FOR A HIGH ENERGY LASER SYSTEM, invented by Milton B. Trageser and assigned to the same assignee of the instant invention, both incorporated herein by reference.

Referring now to FIGS. 2, 3A and 4B, the operation of the extracavity laser separator embodiment of the limited diffraction feedback laser system having composite sensor, controlled distortion cavity-feedback mirror and cavity turbulence monitor of the present invention is substantially identical to the operation of the FIGS. 1, 3A and 4A embodiment insofar as output high-energy laser light formation, convex secondary reflector figure distortion control, diffraction-induced beam breakup control, real-time cavity turbulence monitoring, and injection laser cavity-feedback prevention are concerned. The operation of the FIGS. 2, 3A and 4B embodiment differs from the operation of the FIG. 1 embodiment in two principal respects. First, boresight alignment of outgoing energy with return energy present along the same but reciprocal optical path during the interpulse intervals is accomplished without the provision of a separate alignment laser therefor.

In the embodiment of FIGS. 2, 3A, and 4B, return energy is reflected off the optics 24 during the interpulse intervals of successive outgoing pulses of high-energy laser and is deviated off the scrapper mirror 22 into the cavity 16. The return energy oscillates between the cavity mirrors 12, 14 successively converging towards the axis thereof in such a way as to define for each round trip oscillation "n" an annular beam collimated when illuminating the primary reflector having a magnification factor "$M^n$" and having a "telescoped" spot size inversely proportional to the magnification factor. The return energy passes through the aperture 18 of the concave reflector 12 and is deviated off the reflecting surface 30 of the separator 26. Aligned outgoing and received energy produce co-axially aligned annular beams of different magnification factor, while mis-aligned outgoing and received energy produce co-axially mis-aligned annular beams of different magnification factor. A light extractor, not shown, positioned intermediate the surface 30 and optics 72 is provided for extracting two or more annular beams of selected different magnification factor, which are imaged through the optics 72 onto the mosaic array 112 of the composite sensor 124 (FIG. 4B) producing sensor images 126, 128 representative thereof. A control signal, not shown, is responsive to the relative mis-alignment of the spots 126, 128 to so tilt the x, y actuator 100 (FIG. 3A) of the convex reflector assembly as to maintain subsequent outgoing pulses on-target. For a further description of the alignment process, and of the light extractor, reference may be had to co-pending U.S. utility patent application Ser. No. 640,504 entitled, now U.S. Pat. No. 4,633,479 ALIGNMENT SYSTEM FOR A CONFOCAL UNSTABLE LASER SYSTEM invented by Milton B. Trageser and assigned to the same assignee of the instant invention, incorporated herein by reference.

The manner of injection laser alignment with the optical axis of the cavity 16 is the second principal respect in which the FIG. 2 embodiment differs from the embodiment of FIG. 1. During the interpulse intervals and synchronous with the times when the reflecting surface 32 of the laser separate 26 is aligned with the axis of the cavity 16, the injection laser is deviated off the reflecting surface 32 of the preferably rapidly spinning disk 28 through the extended corner cube reflector 74 and onto the quad cell sensor 114 of the composite sensor 124 (FIG. 4B) via the imaging optics 72 producing as spot designated 132 in FIG. 4B representative thereof. The quad cell sensor 114 (FIG. 4B) provides a signal representative of the deviation of the injection laser spot off optical null. The surfaces 32, 30 of the separator 26 define a common optical aperture for the outgoing and the injection laser light, so that the deviations off optical null are representative of intracavity injection laser misalignment. A control signal, not shown, responsive to the quad cell sensor signal is applied to the x, y actuator 58 of the relay mirror 54 to correct for any injection laser mis-alignment. The centering sensor array 62 is cooperative with the x, y actuator 56 of the relay mirror 52 like in the embodiment of FIG. 1 to maintain the pointing direction of the injection laser centered within the aperture 18 of the convex mirror 12. It should be noted that the function of the laser separator can be accomplished by other suitable means such as a beam splitting element provided the injection laser power is suitably low. It should also be noted that the elements 26, 44, 74 and associated components can be advantageously coupled at the low-power side of the amplifier 50 as schematically illustrated by an arrow designated at 51.

It will be appreciated that many modifications of the presently disclosed invention will become apparent to those skilled in the art without departing from the scope of the appended claim.

What is claimed is:

1. A multiple-function sensor, comprising:
    a first wide field-of-view sensor sub-assembly of comparatively-large physical dimensions having a N×N array of comparatively low-bandwidth, light-responsive elements for providing a first sensing capability, where N is an integer greater than two;
    a second narrow field-of-view sensor sub-assembly of comparatively-small physical dimension having a 2×2 array of comparatively high-bandwidth, light-responsive elements for providing a second sensing capability; and
    means for superimposing said second sensor sub-assembly onto said first sensor sub-assembly in the same physical location.

2. The multiple-function sensor of claim 1, wherein said first sensor is a mosaic array sensor.

3. The multiple-function sensor of claim 2, wherein said second sensor is a quad cell sensor.

4. The multiple-function sensor of claim 3, wherein said quad sensor is hard-wired onto said mosaic array sensor.

5. The multiple-function sensor of claim 3, wherein preselected ones of said mosaic array elements are dedicated to serve as the elements of said second sensor.

6. The multiple-function sensor of claim 1, wherein said first and said second sensor sub-assemblies each have a preselected wavelength response characteristic.

7. The multiple-function sensor of claim 6, wherein said characteristics are selected to be different from each other.

8. The multiple-function sensor of claim 1 wherein the first sensor sub-assembly includes sufficient array elements to resolve multiple-spots and wherein said second sensor sub-assembly elements are arranged as a quad cell array for nulling.

9. The multi-function sensor of claim 1, wherein said first and said second sensor sub-assemblies are operative to simultaneously view their respective fields of view.

* * * * *